United States Patent
Moshe et al.

(10) Patent No.: US 9,465,396 B2
(45) Date of Patent: *Oct. 11, 2016

(54) AVS MASTER SLAVE

(71) Applicant: Marvell Israel (M.I.S.L) Ltd., Yokneam (IL)

(72) Inventors: Michael Moshe, Kiriat Tivon (IL); Reuven Ecker, Haifa (IL); Ido Bourstein, Pardes Hana-Karkur (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 222 days.

This patent is subject to a terminal disclaimer.

(21) Appl. No.: 13/874,924

(22) Filed: May 1, 2013

(65) Prior Publication Data

US 2013/0293276 A1 Nov. 7, 2013

Related U.S. Application Data

(60) Provisional application No. 61/640,934, filed on May 1, 2012.

(51) Int. Cl.
*G06F 1/32* (2006.01)
*G05F 1/625* (2006.01)

(52) U.S. Cl.
CPC ............ *G05F 1/625* (2013.01); *G06F 1/3296* (2013.01); *Y02B 60/1285* (2013.01)

(58) Field of Classification Search
None
See application file for complete search history.

(56) References Cited

U.S. PATENT DOCUMENTS

| | | |
|---|---|---|
| 8,354,857 B1 | 1/2013 | Rosen |
| 8,370,654 B1 | 2/2013 | Hasko et al. |
| 2004/0230844 A1* | 11/2004 | Zalesski ................. 713/300 |
| 2010/0329054 A1* | 12/2010 | Azimi et al. ............. 365/201 |
| 2011/0157956 A1* | 6/2011 | Rotem ........................ 365/94 |
| 2012/0038334 A1* | 2/2012 | Peng .............. H02M 3/1588 323/282 |
| 2013/0249290 A1* | 9/2013 | Buonpane et al. ......... 307/31 |

FOREIGN PATENT DOCUMENTS

CN 103324266 A 9/2013

* cited by examiner

*Primary Examiner* — Paul Yanchus, III

(57) ABSTRACT

Aspects of the disclosure provide an integrated circuit (IC). The IC includes an input interface and a controller. The input interface is configured to receive an input signal providing information for controlling a supply voltage based on a performance characteristic of another IC. The controller is configured to generate an output signal for controlling the supply voltage based on a combination of the input signal and a performance characteristic of the IC.

17 Claims, 6 Drawing Sheets

| AVS-IN | LOCAL INDICATOR | AVS-OUT |
|---|---|---|
| 0 | 0 | 0 |
| 0 | 1 | 1 |
| 1 | 0 | 1 |
| 1 | 1 | 1 |

0: KEEP CURRENT VOLTAGE
1: INCREASE VOLTAGE

*FIG. 3*

AVS MASTER SLAVE

INCORPORATION BY REFERENCE

This present disclosure claims the benefit of U.S. Provisional Application No. 61/640,934, "AVS Master Slave" filed on May 1, 2012, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various electronic devices receive one or more supply voltages from voltage regulators that are external to the electronic devices. In an example, an integrated circuit (IC) chip receives a supply voltage from an external voltage regulator. The IC chip provides to the voltage regulator a feedback signal based on the supply voltage input to the IC chip. The voltage regulator regulates the supply voltage to the IC chip based on the feedback signal.

SUMMARY

Aspects of the disclosure provide an integrated circuit (IC). The IC includes an input interface and a controller. The input interface is configured to receive an input signal providing information for controlling a supply voltage based on a performance characteristic of another IC. The controller is configured to generate an output signal for controlling the supply voltage based on a combination of the input signal and a performance characteristic of the IC.

In an embodiment, the input interface is configured to receive the input signal in a digital form. In an example, the input interface is configured to receive the input signal for controlling the supply voltage of the other IC to meet a performance requirement. The controller is configured to generate the output signal in a digital form for controlling the supply voltage based on the performance characteristic of the IC and the input signal, and to provide the output signal to a third IC.

According to an aspect of the disclosure, the controller includes a feedback voltage generator configured to generate a feedback voltage signal for controlling a voltage regulator to regulate the supply voltage to the IC and to the other IC. In an embodiment, the IC includes an output interface that can be configured to output the output signal in a digital form, and can be configured to output the feedback voltage signal in an analog form.

In an example, the IC includes a speed indicator configured to generate a signal indicative of a speed of the IC, and the controller is configured to generate the output signal based on the input signal and the signal indicative of the speed of the IC.

Aspects of the disclosure provide a method. The method includes receiving by an integrated circuit (IC) an input signal from another IC. The input signal provides information for controlling a supply voltage based on a performance characteristic of the other IC. Further, the method includes generating an output signal based on a combination of the input signal and a performance characteristic of the IC.

Aspects of the disclosure provide a system. The system includes a voltage regulator configured to regulate a supply voltage to multiple integrated circuits (ICs). Further, the system includes a first IC configured to output a first signal for controlling the supply voltage based on a performance characteristic of the first IC, and a second IC configured to receive the first signal, and to generate a second signal for controlling the supply voltage based on a combination of the first signal and a performance characteristic of the second IC.

BRIEF DESCRIPTION OF THE DRAWINGS

Various embodiments of this disclosure that are proposed as examples will be described in detail with reference to the following figures, wherein like numerals reference like elements, and wherein:

FIG. 3 shows a table 300 for generating a control signal in the system 200 according to an embodiment of the disclosure;

DETAILED DESCRIPTION OF EMBODIMENTS

Figure 1:
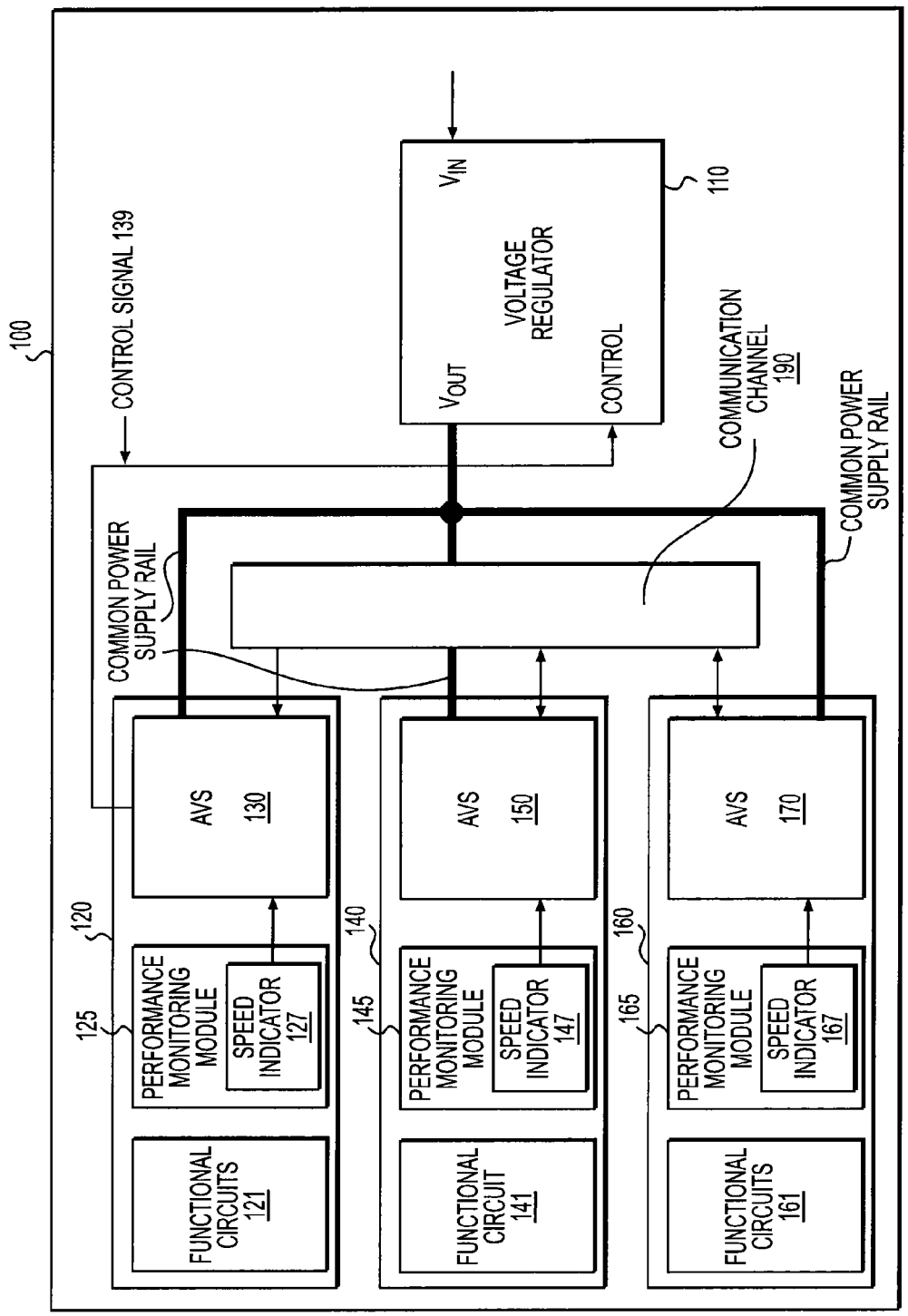
FIG. 1 shows a block diagram of a system example 100 according to an embodiment of the disclosure.

FIG. 1 shows a block diagram of a system example 100 according to an embodiment of the disclosure. The system 100 includes a plurality of circuit blocks 120, 140, and 160, and a voltage regulator 110 configured to provide a supply voltage to the plurality of circuit blocks 120, 140 and 160. These elements are coupled together, in an embodiment, as shown in FIG. 1. One of the circuit blocks, such as the circuit block 120, is configured as a master for adaptive voltage scaling (AVS), and the other circuit blocks, such as the circuit blocks 140 and 160 are configured as slaves for AVS. The master and slaves communicate via a communication channel 190. The master provides a control signal to the voltage regulator 110 based on information collected from the circuit blocks 120, 140 and 160.

In the FIG. 1 example, each of the circuit blocks 120, 140 and 160 includes an AVS module which is a controller to determine a voltage requirement and to generate a control signal indicative of the voltage requirement, such as disclosed in Applicant's U.S. Pat. No. 8,370,654, issued on Feb. 5, 2013, which is incorporated herein by reference in its entirety.

Specifically, the circuit block 120 includes functional circuits 121, a performance monitoring module 125 and an AVS module 130. The functional circuits 121 can be any suitable functional circuits, such as a central processing unit (CPU), logic circuits, memory circuits, an amplifier circuit, an analog-to-digital converter, a digital-to-analog converter, and the like.

The performance monitoring module 125 monitors one or more parameters indicative of a performance characteristic of the functional circuits 121. In an example, the performance monitoring module 125 is configured to monitor a voltage in the circuit block 120 during operation. In another example, the performance monitoring module 125 is configured to monitor a speed in the circuit block 120. In the FIG. 1 example, the performance monitoring module 125 includes a speed indictor circuit 127 suitably configured to generate a parameter indicative of a circuit speed, such as disclosed in Applicant's U.S. Pat. No. 8,354,857, issued on Jan. 15, 2013, which is incorporated herein by reference in its entirety.

The AVS module 130 is a master AVS module that generates a control signal 139 based on the monitored parameters by the performance monitoring module 125, and information of other circuit blocks 140 and 160 provided via the communication channel 190. In an example, the monitored parameters are functions of the provided supply voltage, and can indicate a voltage requirement for the circuit block 120, such as a voltage range, a minimum voltage and the like, to satisfy performance requirements. Further, the information of the other circuit blocks 140 and 160 is indicative of the voltage requirements of the other circuit blocks 140 and 160. The AVS 130 generates the control signal 139 to combine the voltage requirement of circuit block 120 with the voltage requirements of the other circuit blocks 140 and 160. Then, the control signal 139 is provided to the voltage regulator 110 to regulate the supply voltage provided to the circuit blocks 120, 140 and 160.

The circuit block 140 includes functional circuits 141, a performance monitoring module 145 and an AVS module 150. The functional circuits 141 can be any suitable functional circuits that can be the same as the functional circuits 121 or can be different from the functional circuits 121.

The performance monitoring module 145 monitors one or more parameters indicative of a performance characteristic of the functional circuits 141. In an example, the performance monitoring module 145 is configured to monitor a voltage in the circuit block 140 during operation. In another example, the performance monitoring module 145 is configured to monitor a circuit speed in the circuit block 140. For example, the performance monitoring module 145 is configured to measure a delay of one or more inverters, and use the delay as an indicator of the circuit speed in the circuit block 140.

In the embodiment of FIG. 1, the AVS module 150 is a slave AVS module that determines a voltage requirement based on the monitored parameters by the performance monitoring module 145, and provides information to the master AVS module, such as the AVS 130, via the communication channel 190.

Similarly, the circuit block 160 includes functional circuits 161, a performance monitoring module 165 and an AVS module 170. The functional circuits 161 can be any suitable functional circuits that can be the same as the functional circuits 121/141 or can be different from the functional circuits 121/141.

The performance monitoring module 165 monitors one or more parameters indicative of a performance characteristic of the circuit functional circuits 161. In an example, the performance monitoring module 165 is configured to monitor a voltage in the circuit block 160 during operation. In another example, the performance monitoring module 165 is configured to monitor a speed of the circuit block 160.

In the embodiment of FIG. 1, the AVS module 170 is a slave AVS module that determines a voltage requirement based on the monitored parameters by the performance monitoring module 165, and provides information to the master AVS module, such as the AVS 130, via the communication channel 190.

The communication channel 190 is configured to transmit the voltage requirement information from the slave AVS modules, such as the AVS 150 and AVS 170, to the master AVS module 130. The communication channel 190 is configured to have any suitable architecture, such as a chain, a network, and the like.

During operation, in an example, the slave AVS modules 150 and 170 respectively generate information indicative of voltage requirements of the circuit blocks 140 and 160, and provide the information to the master AVS 130 via the communication channel 190. The master AVS module 130 receives the information, and combines the information with the voltage requirement of the circuit block 120 to generate the control signal 139. The control signal 139 is then provided to the voltage regulator 110 to regulate the supply voltage provided to the circuit blocks 120, 140 and 160.

According to an aspect of the disclosure, the control signal 139 is generated in a manner to make the supply voltage provided by the voltage regulator 110 to satisfy a worst case voltage requirement, such as being about the same or larger than the largest voltage of the minimum voltages required by the circuit block 120, 140 and 160. In an example, the plurality of circuit blocks 120, 140 and 160 are implemented as integrated circuit (IC) chips 120, 140 and 160. The IC chips 120, 140 and 160 and the voltage regulator 110 are assembled on a printed circuit board (PCB) in the system 100, in an embodiment. The IC chips 120, 140 and 160 may be produced under different process conditions, and may have different device parameters. Further, during operation, the IC chips 120, 140 and 160 may have dynamic thermal conditions which affect performance of the respective IC chips. For example, at a given moment in time, the IC chip 120 is actively working and generates a large amount of heat that raises the chip temperature while the IC chip 140 is idle most of the time and has a relatively low temperature; at another time, the IC chip 140 is actively working and generates a large amount of heat that raises the chip temperature while the IC chip 120 is idle most of the time and has a relatively low temperature. In an example, the control signal 139 is generated dynamically in a manner to make the supply voltage satisfy a minimum voltage requirement for the slowest chip among the IC chips 120, 140 and 160 so that all of the IC chips 120, 140 and 160 satisfy a speed requirement of the system 100. In one scenario, the control signal 139 ensures that all of the IC chips 120, 140 and 160 satisfy a minimum speed requirement for all of the chips. However, in another scenario, the control signal 139 ensures that the supply voltage will not exceed an upper bound that results in one or more of the chips exceeding a maximum speed parameter (i.e., the chip is too leaky), such as described in Applicant's co-pending U.S. patent application Ser. No. 12/979,724, filed on Dec. 28, 2010, which is incorporated herein by reference in its entirety.

According to an aspect of the disclosure, the system 100 uses a single voltage regulator to provide a supply voltage dynamically based on a weakest chip in the chain in order to satisfy a speed requirement of the system 100, the system 100 can be implemented to have a reduced weight, a reduced size, and a reduced cost compared to a system that uses multiple voltage regulators.

It is noted that, in an embodiment, the circuit blocks 120, 140 and 160 are implemented on an IC chip, and the voltage regulator 110 can be implemented on the same IC chip or can be implemented off the IC chip.

Figure 2:
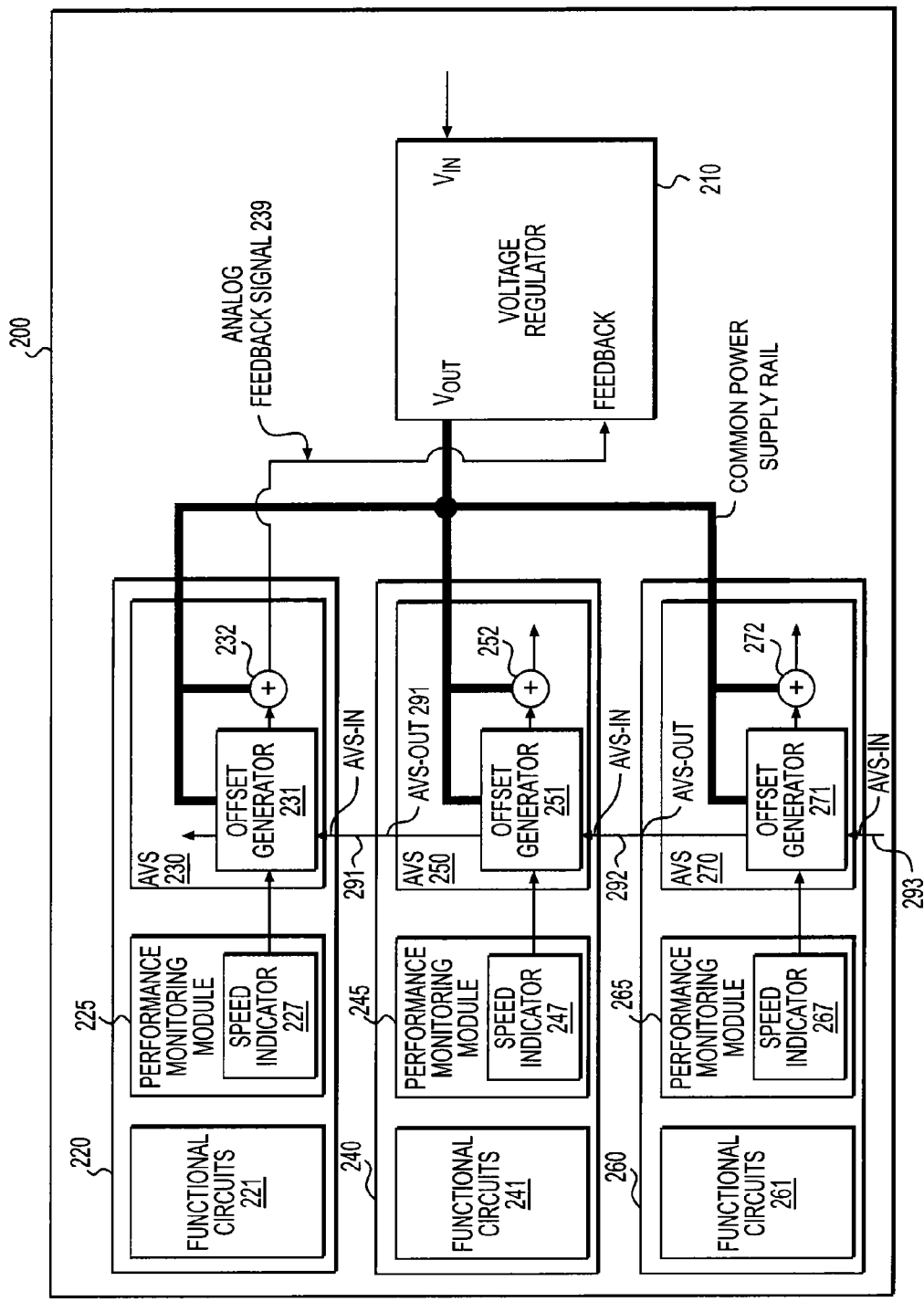
FIG. 2 shows a block diagram of a detailed system example 200 according to an embodiment of the disclosure.

FIG. 2 shows a block diagram of a system example 200 according to an embodiment of the disclosure. The system 200 includes IC chips 220, 240 and 260, a voltage regulator 210, and a communication channel formed by conductive components to transmit signals 291, 292 and 293 for example. The functionality of these signals will be elaborated in the following paragraphs. These elements are coupled together as shown in FIG. 2.

The system 200 operates similarly to the system 100 described above. The system 200 also includes certain components that are identical or equivalent to those used in the system 100; the description of these components has been provided above and will be omitted here for clarity purposes.

In the FIG. 2 example, the AVS modules 230, 250 and 270 are coupled together in a chain architecture. Specifically, each AVS module is configured similarly to include an offset generator and a feedback voltage generator. For example, the AVS module 230 includes an offset generator 231 and a feedback voltage generator 232; the AVS module 250 includes an offset generator 251 and a feedback voltage generator 252; and the AVS module 270 includes an offset generator 271 and a feedback voltage generator 272.

In an example, the offset generators 231, 251 and 271 are configured to operate in the digital domain to process information of voltage requirements, and generate a voltage offset indicative of a preferred voltage adjustment, and the feedback voltage generator 232, 252 and 272 are configured to combine the voltage offset with a received voltage to generate a feedback signal in the form of an analog signal. It is noted that, in another example, the AVS modules 230, 250 and 270 are configured to generate a feedback signal in the form of a digital signal.

Further, the AVS modules 230, 250 and 270 are coupled together in a communication chain to generate a feedback signal 239 based on the voltage requirements of the IC chips 220, 240 and 260. The feedback signal 239 is provided to the voltage regulator 210 to regulate the supply voltage to the circuit blocks 220, 240 and 260.

Specifically, in the embodiment of FIG. 2 the offset generator 271 receives values of the monitored parameters from the performance monitoring module 265, determines a voltage requirement for the circuit block 260, and generates a signal 292 indicative of the voltage requirement. It is noted that, in an example, the offset generator 271 receives a signal 293 indicative of a voltage requirement from a circuit block (not shown) down the chain, the offset generator 271 can determine the voltage requirement cumulatively based on the values of the monitored parameters from the performance monitoring module 265 and the signal 293. In an example, the signal 293 and the signal 292 are digital signals indicative of the voltage requirements. The offset generator 271 uses digital signal processing techniques to process the signal 293, and generates the signal 292.

Further, the offset generator 251 receives values of monitored parameters from the performance monitoring module 245, and the signal 292 which is indicative of the cumulative voltage requirement down the chain. The offset generator 251 cumulatively determines a voltage requirement based on the values of the monitored parameters from the performance monitoring module 245 and the signal 292, and generates a signal 291 indicative of the voltage requirement that is need to for the functional circuits 241 and the functional circuits 261 to meet a performance requirement, such as a speed requirement, a leakage requirement, and the like. In an example, the offset generator 251 uses digital signal processing techniques to process the signal 292 and values of the monitored parameters, and generates the signal 291.

The offset generator 231 receives values of the monitored parameters from the performance monitoring module 225, and the signal 291 which is indicative of the cumulative voltage requirement down the chain. The offset generator 231 cumulatively determines a voltage requirement based on the values of the monitored parameters by the performance monitoring module 225 and the signal 291, and generates a voltage offset. The voltage offset is provided to the feedback voltage generator 232. The feedback voltage generator 232 combines the voltage offset with a voltage received by the IC chip 220 to generate a feedback signal 239. The feedback signal 239 is provided to the voltage regulator 210 to regulate the supply voltage to the IC chips 220, 240 and 260. In an example, the feedback signal is an analog signal. In another example, the AVS module 230 is suitably configured that the feedback signal 239 is a digital signal.

According to an aspect of the disclosure, the AVS modules 230, 250 and 270 are implemented based on an AVS intellectual property (IP) block that includes an offset generator and a feedback voltage generator. The offset generator processes signals and information in the digital domain to generate a voltage offset, and the feedback voltage generator 232 generates the feedback signal 239 based on the voltage offset.

Further, each AVS block includes an input pin (or pad) AVS-IN and an output pin (or pad) AVS-OUT. By suitably coupling the input pins and output pins of the AVS modules 230, 250 and 270, the AVS modules 230, 250 and 270 form an AVS chain to generate the feedback signal 239. In the FIG. 2 example, the output pin AVS-OUT of the AVS module 270 is coupled to the input pin AVS-IN of the AVS module 250 via any suitable conductive components and the output pin AVS-OUT of the AVS module 250 is coupled to the input pin AVS-IN of the AVS module 230 via any suitable conductive components.

It is noted that in the FIG. 2 example, each of AVS modules 230, 250 and 270 also include a feedback pin for outputting the feedback signal 239. The feedback pin of the AVS module 230 is coupled to an input pin of the voltage regulator 210. The feedback pins of the AVS modules 250 and 270 are not in use, in an embodiment.

It is noted that, in another implementation, the feedback voltage generators 252 and 272 are suitably removed and the feedback pins of the AVS modules 250 and 270 can be suitably removed.

FIG. 3 shows a table 300 for generating a control signal according to an embodiment of the disclosure. In this example, the table 300 corresponds to a daisy chain implementation of the communication channel 190. In an embodiment, the table 300 is a truth table for implementing logic circuits in an offset generator within an AVS module, such as the offset generators 231, 251 and 271 within the AVS modules 230, 240 and 260. In particular, in an example, the table 300 is used for determining whether to provide a signal that will cause a voltage regulator to maintain the current supply voltage or modify the supply voltage.

Specifically, the table 300 includes a first column 310, a second column 320 and a third column 330. For each row, the first column 310 includes a binary value AVS-IN received from the input pin; the second column 320 includes a binary value of a local indicator determined based on values of the monitored parameters from a local performance monitoring module; and the third column 330 includes a binary value AVS-OUT output from the output pin as a function of the binary values in the first column 310 and the second column 320 of the same row. The local indicator indicates a local voltage requirement of the present IC chip, for example.

In the FIG. 3 example, binary value "0" indicates keeping the current supply voltage and binary value "1" indicates increasing the supply voltage. The truth table 300 can be implemented using a OR logic, then when both local indictor and the input value AVS-IN are indicative of keeping current supply voltage, the output value AVS-OUT indicates keeping current supply voltage; otherwise, the output value AVS-OUT indicates increasing supply voltage.

It is noted that the binary values can be defined differently to indicate different voltage requirement, such as increasing the supply voltage, decreasing the supply voltage, and the like. It is also noted that the binary value can include more than one bit to define the voltage requirement. In an example, the binary value includes two bits to define three different voltage requirements, such as increasing the supply voltage, maintaining the supply voltage, decreasing the supply voltage. In another example, the binary value includes multiple bits to indicate different gradations for increasing or decreasing the supply voltage.

Figure 4:
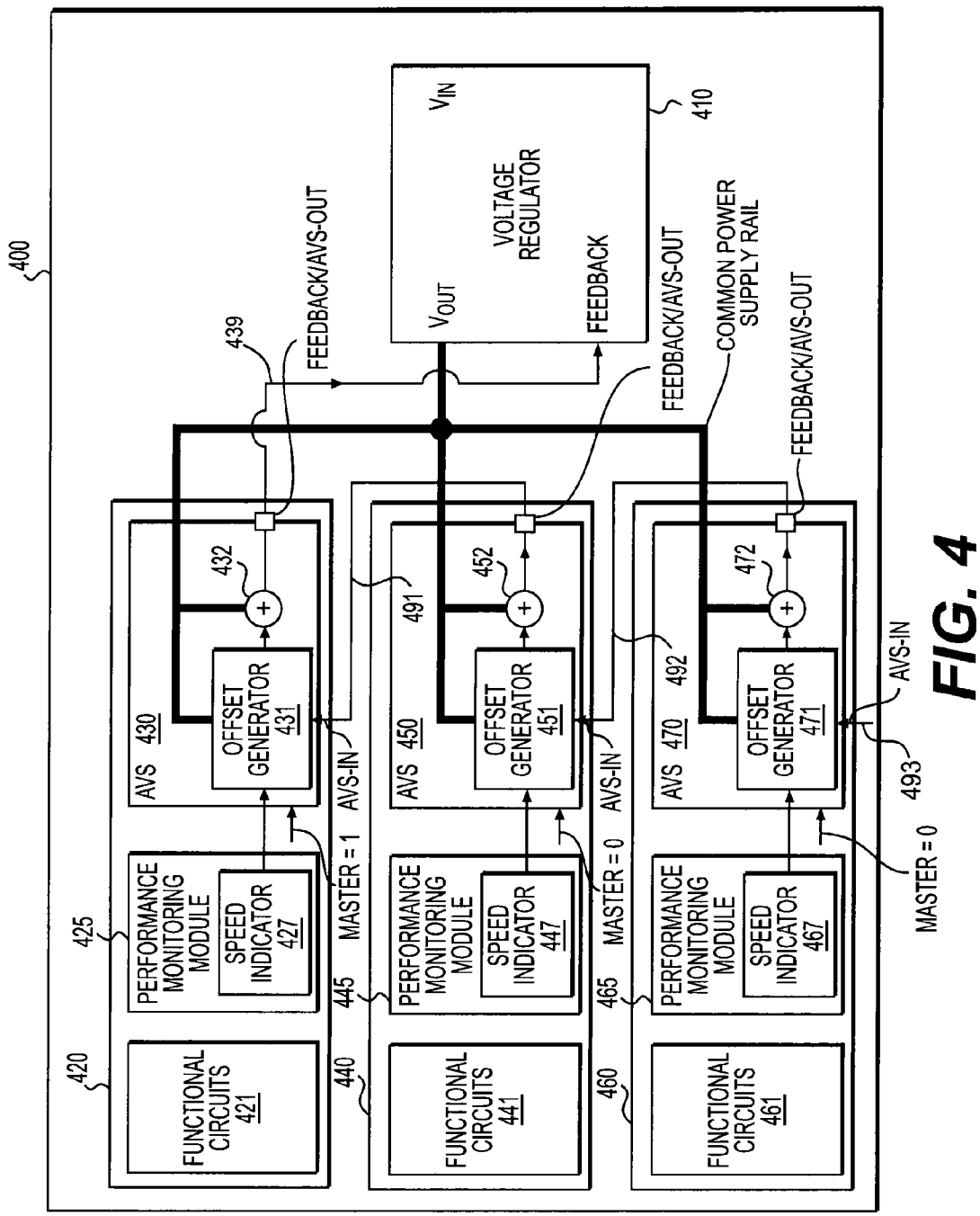
FIG. 4 shows a block diagram of another detailed system example 400 according to an embodiment of the disclosure.

FIG. 4 shows a block diagram of a system example 400 according to an embodiment of the disclosure. The system 400 includes IC chips 420, 440 and 460, a voltage regulator 410, and a communication channel formed by conductive components to pass signals 491, 492 and 493 for example. These elements are coupled together as shown in FIG. 4.

The system 400 operates similarly to the system 200 described above. The system 400 also includes certain components that are identical or equivalent to those used in the system 200; the description of these components has been provided above and will be omitted here for clarity purposes.

In the FIG. 4 example, the AVS modules 430, 450 and 470 are implemented based on an AVS intellectual property (IP) block with a reduced number of pins. For example, each AVS module includes an input pin AVS-IN and an output pin FEEDBACK/AVS-OUT. As shown, the respective output pins FEEDBACK/AVS-OUT are couple with the respective voltage generators 472, 452 and 432 that are configured to combine a voltage offset with a received voltage to generate a feedback signal. By suitably coupling the input pins and output pins of the AVS modules 430, 450 and 470, the AVS modules 430, 450 and 470 form an AVS chain. In the FIG. 4 example, the output pin FEEDBACK/AVS-OUT of the AVS module 470 is coupled to the input pin AVS-IN of the AVS module 450 via any suitable conductive components and the output pin FEEDBACK/AVS-OUT of the AVS module 450 is coupled to the input pin AVS-IN of the AVS module 430 via any suitable conductive components. The output pin FEEDBACK/AVS-OUT of the AVS module 430 is coupled to the feedback pin of the voltage regulator 410.

Further, the AVS block can be configured to use the output pin FEEDBACK/AVS-OUT as a digital pin for outputting the digital signal AVS-OUT or as an analog pin for outputting the feedback signal 439. In the FIG. 4 example, each of the AVS modules 430, 450 and 470 receives a master signal MASTER, and configures the output pin based on the master signal MASTER. For example, when the master signal MASTER is logic "1" (e.g., in the case of AVS module 430), the output pin is configured as an analog pin for outputting the feedback signal 439; and when the master signal MASTER is logic "0" (e.g., in the case of AVS modules 450 and 470), the output pin is configured as a digital pin for outputting the digital signal AVS-OUT. When the output pin is configured as a digital pin and feedback signals 491 and 492 are digital, for instance at offset generators 451 and 471, a selectable bypass circuit (not shown) is asserted to cause the feedback signals 491 and 492 to bypass the corresponding feedback voltage generators 452 and 472. However, when the output pin is configured as an analog pin and the feedback signal 439 is analog, for instance at offset generator 431, the selectable bypass circuit is not asserted such that the feedback signal is provided to the feedback voltage generator. In an example, the feedback voltage generators 452 and 472 are by-passed when the master signal MASTER is logic "0" for the AVS modules 450 and 470.

In an example, the master signals MASTER are static input signals and can be latched into the IC chips during power up.

Figure 5:
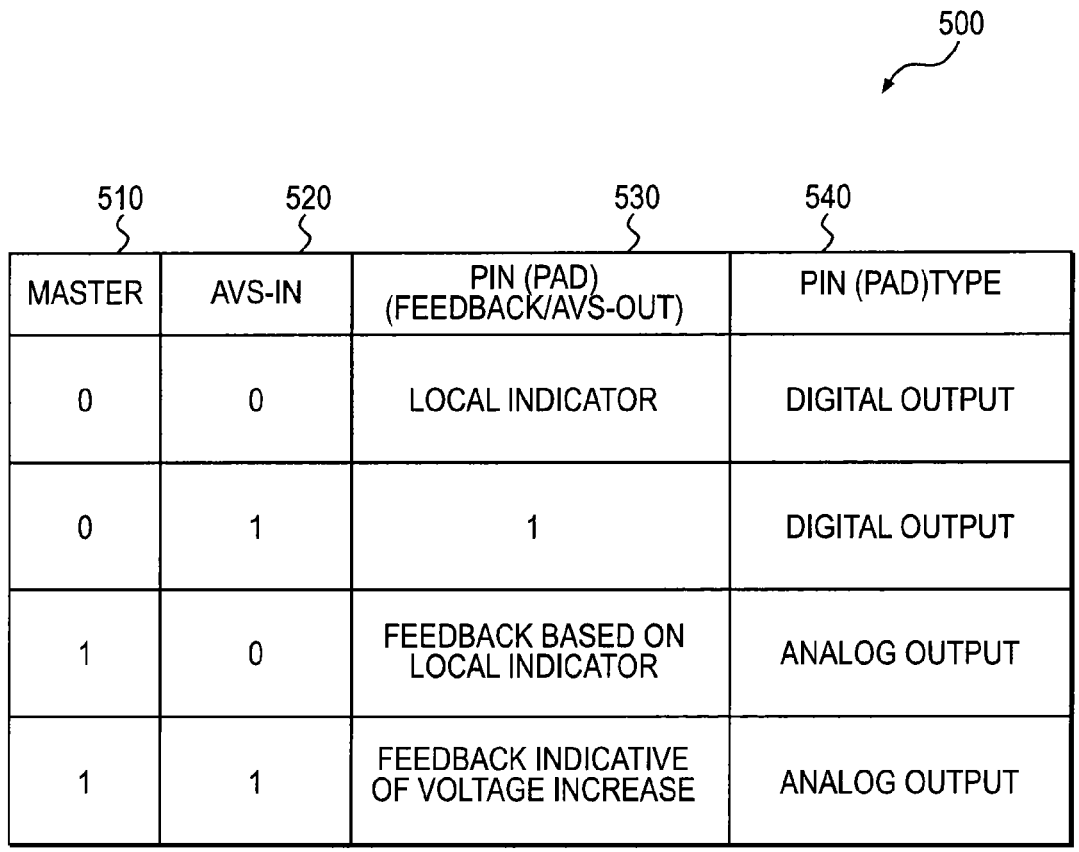
FIG. 5 shows a table 500 for configuring a pin or a pad in the system 400 according to an embodiment of the disclosure.

FIG. 5 shows a table 500 for configuring a pin or pad according to an embodiment of the disclosure. The table 500 includes a first column 510, a second column 520, a third column 530 and a fourth column 540. For each row, the first column 510 includes a binary value received from the master signal MASTER; the second column 520 includes a binary value AVS-IN received from the input pin; the third column 530 indicates an output signal FEEDBACK/AVS-OUT from the output pin or pad; and the fourth column 540 indicates the type of the output pin or pad.

In the FIG. 5 example, when the master signal MASTER is binary value "0", the output pin (or pad) outputs a digital output AVS-OUT. The digital output AVS-OUT depends on the local indicator and the input value AVS-IN. When the master signal MASTER is a binary value "1", the output pin (or pad) outputs the analog feedback signal and the analog signal is generated based on the local indicator and the input value AVS-IN.

Figure 6:
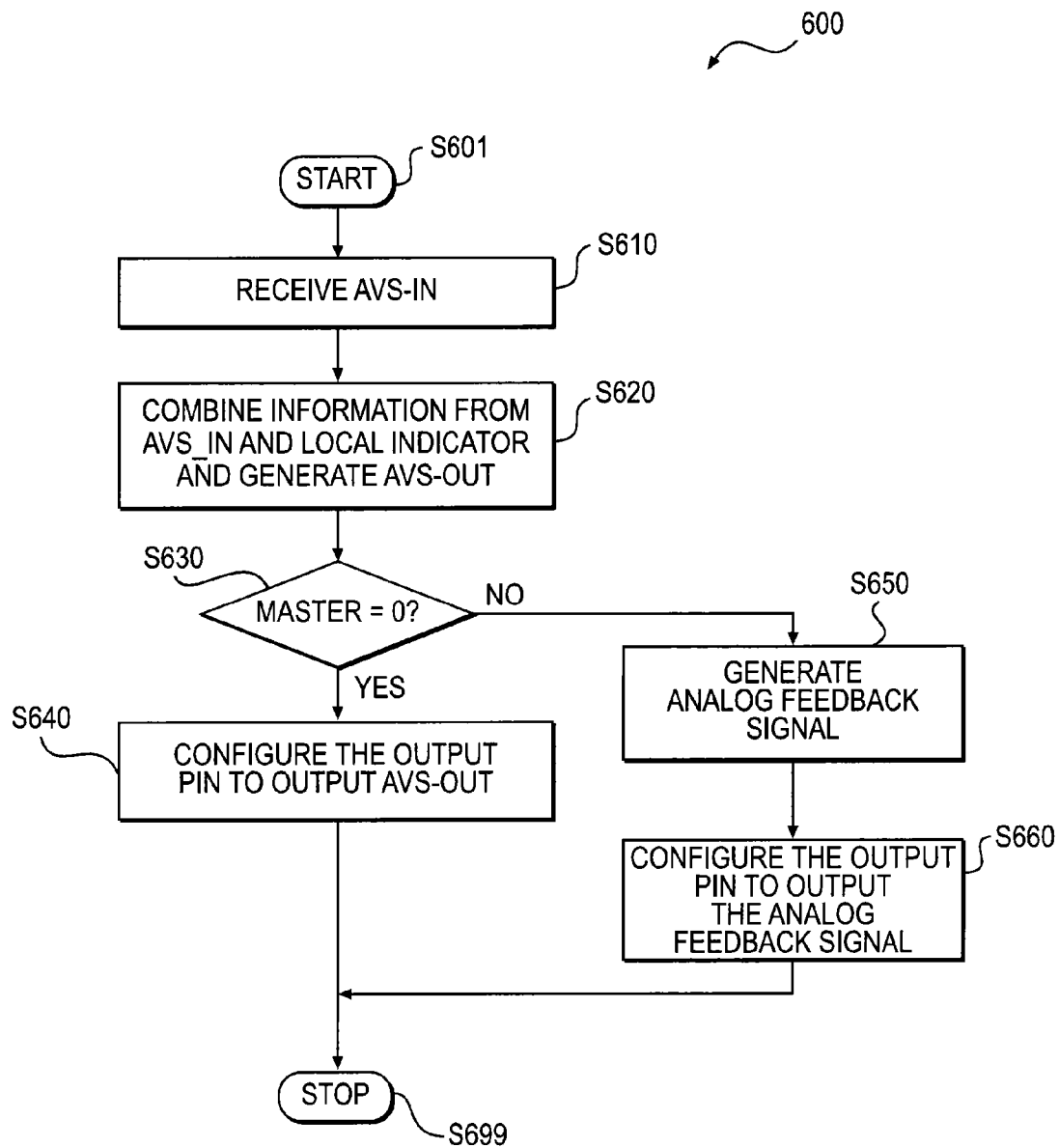
FIG. 6 shows a flowchart outlining a process example 600 according to an embodiment of the disclosure.

FIG. 6 shows a flowchart outlining a process example 600 according to an embodiment of the disclosure. In an example, the process 600 can be executed by an AVS module, such as each of the AVS modules 430, 450 and 470. The process starts at S601 and proceeds to S610.

At S610, the AVS module receives an input signal AVS-IN from the input pin. The input signal AVS-IN is indicative of a cumulative voltage requirement from AVS modules down the chain.

At S620, the AVS module combines information from the input signal AVS-IN with a local indictor, and generate a digital signal AVS-OUT. Thus, the digital signal AVS-OUT is indicative of a cumulative voltage requirement of the present AVS module and the AVS modules down the chain.

At S630, the AVS module branches operations based on the master signal MASTER. When the master signal MASTER is logic "0", the process proceeds to S640; otherwise, the process proceeds to S650.

At S640, the output pin is configured as a digital output pin to output the digital signal AVS-OUT. Then the process proceeds to S699 and terminates.

At S650, the AVS module generates an analog feedback signal for controlling the supply voltage.

At S660, output pin is configured as an analog pin to output the analog feedback signal. In an example, the analog feedback signal is provided to a voltage regulator to control a supply voltage. Then the process proceeds to S699 and terminates.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An integrated circuit (IC), comprising:
an input interface configured to receive an input signal providing information for controlling a supply voltage based on a performance characteristic of another IC; and
a controller configured to generate an output signal for controlling the supply voltage based on a combination of the input signal and a performance characteristic of the IC, the controller including a feedback voltage generator configured to generate a feedback voltage signal by combining an offset voltage with the supply voltage to control a voltage regulator to regulate the supply voltage to the IC and to the other IC.

2. The circuit of claim 1, wherein the input interface is configured to receive the input signal in a digital form.

3. The circuit of claim 1, wherein the controller is configured to generate the output signal in a digital form for controlling the supply voltage based on the performance characteristic of the IC and the input signal, and to provide the output signal to a third IC.

4. The circuit of claim 1, wherein the input interface is configured to receive the input signal for controlling the supply voltage of the other IC to meet a performance requirement.

5. The circuit of claim 1, further comprising:
an output interface configured to output one of the output signal in a digital form, and the feedback voltage signal in an analog form.

6. The circuit of claim 1, wherein:
a speed indicator is configured to generate a signal indicative of a speed of the IC; and
the controller is configured to generate the output signal based on the input signal and the signal indicative of the speed of the IC.

7. A method, comprising:
receiving by an integrated circuit (IC) an input signal from another IC, the input signal providing information for controlling a supply voltage based on a performance characteristic of the other IC;
generating a feedback voltage signal by combining an offset voltage with the supply voltage to control a voltage regulator to regulate the supply voltage to the IC and to the other IC based on the supply voltage and the input signal; and
generating an output signal based on a combination of the feedback voltage signal and a performance characteristic of the IC.

8. The method of claim 7, wherein receiving by the IC the input signal from the other IC further comprises:
receiving the input signal in a digital form.

9. The method of claim 7, wherein generating the output signal based on the input signal and the performance characteristic of the IC further comprise:
generating the output signal in a digital form; and
transmitting the output signal to a third IC.

10. The method of claim 7, wherein receiving by the IC the input signal from the other IC further comprises:
receiving the input signal for controlling the supply voltage of the other IC to meet a performance requirement.

11. The method of claim 7, further comprising at least one of:
configuring an output interface to output the output signal in a digital form;
configuring the output interface to output the feedback voltage signal in an analog form.

12. The method of claim 7, further comprising:
generating a signal indicative of a speed of the IC; and
generating the output signal based on the input signal and the signal indicative of the speed of the IC.

13. A system, comprising:
a voltage regulator configured to regulate a supply voltage to multiple integrated circuits (ICs);
a first IC configured to output a first signal for controlling the supply voltage based on a performance characteristic of the first IC; and
a second IC configured to receive the first signal, and to generate a second signal for controlling the supply voltage based on a combination of the first signal and a performance characteristic of the second IC, the second IC including a feedback voltage generator configured to generate a feedback voltage signal by combining an offset voltage with the supply voltage to control a voltage regulator to regulate the supply voltage to the first IC and to the second IC.

14. The system of claim 13, wherein the second IC is configured to receive the input signal in a digital form.

15. The system of claim 13, wherein the second IC is configured to generate the output signal in a digital form for controlling the supply voltage based on the performance characteristic of the second IC and the input signal, and to provide the output signal to a third IC.

16. The system of claim 13, wherein the input interface is configured to receive the input signal for controlling the supply voltage of the other IC to meet a performance requirement.

17. The system of claim 13, wherein IC further comprises:
an output interface configured to output one of the output signal in a digital form, and the feedback voltage signal in an analog form.

* * * * *